United States Patent
Homma

(10) Patent No.: US 10,927,035 B2
(45) Date of Patent: Feb. 23, 2021

(54) METHOD OF MANUFACTURING A SOLAR HEAT COLLECTION PIPE

(71) Applicant: KABUSHIKI KAISHA TOYOTA JIDOSHOKKI, Kariya (JP)

(72) Inventor: Takayuki Homma, Aichi-ken (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 0 days.

(21) Appl. No.: 16/609,877

(22) PCT Filed: Mar. 5, 2018

(86) PCT No.: PCT/JP2018/008379
§ 371 (c)(1),
(2) Date: Oct. 31, 2019

(87) PCT Pub. No.: WO2018/207445
PCT Pub. Date: Nov. 15, 2018

(65) Prior Publication Data
US 2020/0062641 A1  Feb. 27, 2020

(30) Foreign Application Priority Data

May 9, 2017 (JP) .................................. 2017-092999

(51) Int. Cl.
| C03C 17/00 | (2006.01) |
| C03C 17/25 | (2006.01) |
| F24S 10/70 | (2018.01) |
| F24S 70/30 | (2018.01) |
| F24S 10/40 | (2018.01) |
| B05D 7/22 | (2006.01) |
| B05D 1/00 | (2006.01) |
| B05D 1/18 | (2006.01) |

(52) U.S. Cl.
CPC ............ *C03C 17/004* (2013.01); *B05D 1/002* (2013.01); *B05D 1/18* (2013.01); *B05D 7/225* (2013.01); *C03C 17/005* (2013.01); *C03C 17/25* (2013.01); *F24S 10/45* (2018.05); *F24S 10/70* (2018.05); *F24S 70/30* (2018.05); *B05D 2203/35* (2013.01); *B05D 2254/06* (2013.01); *C03C 2217/213* (2013.01); *C03C 2217/73* (2013.01); *C03C 2218/113* (2013.01); *C03C 2218/365* (2013.01)

(58) Field of Classification Search
CPC ..... C03C 17/004; C03C 17/005; C03C 17/25; C03C 2217/213; C03C 2217/73; C03C 2218/113; C03C 2218/365; F24S 10/70; F24S 70/30; F24S 10/45; B05D 2203/35; B05D 2254/06; B05D 1/18; B05D 1/002; B05D 7/225; B05D 1/28; B05D 3/00; B05D 5/06; B05D 7/00; B05D 7/22; B05D 7/222

See application file for complete search history.

(56) References Cited

U.S. PATENT DOCUMENTS

| 4,309,959 A * | 1/1982 | Yamagishi .......... C23C 18/1616 118/408 |
| 6,902,761 B2 * | 6/2005 | Tratzky ................. C03C 17/004 427/235 |
| 9,908,134 B2 * | 3/2018 | Aran ....................... B05D 5/063 |
| 2010/0330276 A1 * | 12/2010 | Wang .................. C23C 18/1619 427/236 |
| 2014/0227429 A1 * | 8/2014 | Nunez Bootello ..... C03C 17/38 427/8 |
| 2018/0195767 A1 | 7/2018 | Homma |

FOREIGN PATENT DOCUMENTS

| CN | 104496200 A | * | 4/2015 |
| JP | 07-031932 A | | 2/1995 |
| JP | 2002-263562 A | | 9/2002 |
| JP | 2015-528887 A | | 10/2015 |
| JP | 2017-015306 A | | 1/2017 |

* cited by examiner

*Primary Examiner* — William P Fletcher, III
(74) *Attorney, Agent, or Firm* — Sughrue Mion, PLLC

(57) ABSTRACT

A method of manufacturing a solar heat collection pipe includes an inner circumferential film forming step of forming an antireflection film on an inner surface of a glass pipe and an outer circumferential film forming step of forming an antireflection film on an outer surface of the glass pipe. These film forming steps are performed so that a part of a coating film through which a coating material is flowed when the coating material is discharged from the glass pipe in a coating material discharging step of the inner circumferential film forming step and a part of a coating film with which the coating material is in contact when the glass pipe is lifted from the coating material in a lifting step of the outer circumferential film forming step are positioned within a half circumference of the glass pipe in a circumferential direction of the glass pipe.

5 Claims, 5 Drawing Sheets

METHOD OF MANUFACTURING A SOLAR HEAT COLLECTION PIPE

CROSS REFERENCE TO RELATED APPLICATIONS

This application is a National Stage of International Application No. PCT/JP2018/008379 filed Mar. 5, 2018, claiming priority based on Japanese Patent Application No. 2017-092999 filed May 9, 2017, the contents of all of which are incorporated herein by reference in their entirety.

TECHNICAL FIELD

The present invention relates to a method of manufacturing a solar heat collection pipe having antireflection films provided on an inner surface and an outer surface of a glass pipe.

BACKGROUND ART

A solar heat power generator that uses solar heat to generate electric power is known. This solar heat power generation device generally collects sunlight by a light-condensing means such as a mirror, heats a heat medium in the solar heat collection pipe by the collected sunlight, and then generates electric power by using the heat energy of the heated heat medium with a power generator. The solar heat collection pipe has a double pipe structure formed of a metal pipe through which heat medium is circulatable and a glass pipe.

The glass pipe of the solar heat collection pipe having such a structure is required to have high light transmission properties in order to efficiently transmit sunlight. In general, when sunlight enters a glass pipe, approximately 4% of the sunlight (100%) that reaches the glass pipe is reflected on each of the outer surface and the inner surface of the glass pipe, and hence approximately 92% of the sunlight passes through the glass pipe of the solar heat collection pipe.

For this reason, a method of reducing the sunlight reflection of the glass pipe by providing antireflection films on the outer surface and the inner surface of the glass pipe has been proposed. Methods of forming an antireflection film on the surface of a glass pipe include a method disclosed in Patent Literature 1. In Patent Literature 1, a glass pipe is fixed in a vertically arranged coating tank in a step of applying liquid coating to the outer surface of the glass pipe. Next, the liquid coating is injected into the coating tank through an injection port formed on the bottom cover of the coating tank. In the coating tank, the liquid coating is filled between the inner circumferential surface of the coating tank and the outer circumferential surface of the glass pipe, and the liquid coating is applied to the outer surface of the glass pipe. When the step of applying the liquid coating to the outer surface of the glass pipe is completed, the liquid coating is discharged from the discharge port formed on the bottom cover of the coating tank.

CITATION LIST

Patent Literature

Patent Literature 1: Japanese Patent Application Publication No. 2015-528887

SUMMARY OF INVENTION

Technical Problem

A desired thickness is set for the antireflection film, and if the film is too thick or too thin than the desired thickness, the antireflection function of the antireflection film is deteriorated. For this reason, it is preferable that the antireflection film is formed to have the desired thickness overall. However, in the method disclosed in Patent Literature 1, since the thickness of the film tends to vary due to liquid level fluctuation or the like as the injection rate and the discharge rate of the liquid coating into the coating tank become higher, the injection rate and the discharge rate cannot be increased, and the film needs to be formed over the entire axial direction of the glass pipe, thereby taking a very long time to form the film. This problem is the same even when an antireflection film is formed on the inner surface of the glass pipe.

An object of the present invention is to provide a method of manufacturing a solar heat collection pipe that can shorten the time required for forming antireflection films.

Solution to Problem

A method of manufacturing a solar heat collection pipe for solving the above problem is a method of manufacturing a solar heat collection pipe, the solar heat collection pipe including: a cylindrical metal pipe through which a heat medium is circulatable; a cylindrical glass pipe arranged outside an outer circumference of the metal pipe; an antireflection film provided on an inner surface of the glass pipe; and an antireflection film provided on an outer surface of the glass pipe. The method includes; an inner circumferential film forming step of forming the antireflection film on the inner surface of the glass pipe; and an outer circumferential film forming step of forming the antireflection film on the outer surface of the glass pipe. The inner circumferential film forming step includes: an inner circumference coating step in which the glass pipe is rotated about a center axis of the glass pipe as a rotation axis while maintaining the center axis in a horizontal position, to apply a coating material in the glass pipe on the inner surface of the glass pipe, to thereby form a coating film; a coating material discharging step in which, after the inner circumference coating step, in a state where a circumferential position of the glass pipe is fixed, the glass pipe is inclined so that one axial end of the glass pipe becomes a lower end, to discharge the coating material remaining in the glass pipe to an outside of the glass pipe; and a drying step of drying the coating film formed in the inner circumference coating step. The outer circumferential film forming step includes an outer circumference coating step in which, in a state where the center axis of the glass pipe is maintained in a horizontal position, the glass pipe is rotated about the center axis as the rotation axis while bringing a part of the outer surface of the glass pipe into contact with the coating material stored in a storage portion throughout an entire axial direction of the glass pipe, to apply the coating material on the outer surface to thereby form a coating film; a lifting step in which, after the outer circumference coating step, in a state where a circumferential position of the glass pipe is fixed, the glass pipe is lifted from the coating material stored in the storage portion while inclining the glass pipe about one axial end of the glass pipe; and a drying step of drying the coating film formed in the outer circumference coating step. The inner circumferential film forming step and the outer circumferential film forming step are performed so that a part of the coating film through which the coating material is flowed when the coating material is discharged from the glass pipe in the coating material discharging step and a part of the coating film with which the coating material is in contact when the glass pipe is lifted from the coating material in the lifting step are positioned within a half circumference of the glass pipe in a circumferential direction of the glass pipe.

According to this, in the inner circumferential film forming step and the outer circumferential film forming step, the glass pipe is rotated to apply the coating material. Since the circumferential length of the glass pipe is shorter than the entire axial length of the glass pipe, the time required to apply the coating material can be shortened as compared with the case of applying the coating material along an axial direction of the glass pipe.

In the inner circumferential film forming step, the coating material discharging step is performed by inclining the glass pipe while fixing the circumferential position of the glass pipe so that the coating material flows in a line, and the drying step is performed by maintaining the state where the glass pipe is inclined for discharging. Due to this, the antireflection film formed on the inner surface of the glass pipe is formed at the part in which the coating material is flowed for discharging the coating material from the glass pipe with a linear part having a thickness different from the other part.

In the outer circumferential film forming step, the lifting step is performed by gradually separating the coating material along the axial direction of the glass pipe by gradually inclining the glass pipe while fixing the circumferential position of the glass pipe in the horizontal state, and the drying step is performed while maintaining the state where the glass pipe is inclined for lifting. Due to this, the antireflection film formed on the outer surface of the glass pipe is formed at the part with which the coating material is in contact when the glass pipe is lifted from the coating material with a linear part having a thickness different from the other part.

However, the part having the different thickness formed in the inner circumferential film forming step and the part having the different thickness formed in the outer circumferential film forming step are positioned within a half circumference of the glass pipe. In the solar heat collection pipe, the parts of the antireflection films having the different thicknesses are positioned on an anti-light-condensing surface of the glass pipe, so that even if parts of the antireflection films have different thicknesses, the light-condensing function is hardly affected. Accordingly, the time required for forming the antireflection films can be shortened without deteriorating the antireflection function.

Regarding the method of manufacturing the solar heat collection pipe, it is preferable to perform the inner circumferential film forming step and the outer circumferential film forming step so that the part of the coating film through which the coating material is flowed when the coating material is discharged from the glass pipe in the coating material discharging step and the part of the coating film with which the coating material is in contact when the glass pipe is lifted from the coating material in the lifting step radially face each other across the glass pipe.

According to this, in the antireflection films, the parts having different thicknesses can be formed at one circumferential position of the antireflection films, and thus the antireflection function can be prevented from being deteriorated as compared with the case where parts having different thicknesses are formed at two circumferential positions of the antireflection films, for example.

Regarding the method of manufacturing the solar heat collection pipe, in the inner circumference coating step, the glass pipe may be rotated by 360 degrees.

According to this, in the inner circumference coating step, when the glass pipe is rotated by 360 degrees with the coating material stored in the glass pipe, the coating film is formed on the entire inner surface of the glass pipe, and the coating material is again stored in a position where the coating material is stored before the glass pipe is rotated. Then, when the coating material is discharged from the glass pipe with the circumferential position of the glass pipe fixed, the antireflection film is formed at only one circumferential position with the part having a thickness different from the other part. Accordingly, the antireflection function can be prevented from being deteriorated as compared with the case where the antireflection film is formed at two circumferential positions with the parts having different thicknesses, for example.

Regarding the method of manufacturing the solar heat collection pipe, in the outer circumference coating step, the glass pipe may be rotated by 360 degrees.

According to this, in the outer circumference coating step, when the glass pipe is rotated by 360 degrees with the coating material in contact with the outer circumferential surface of the glass pipe, the part of the coating film in contact with the coating material before the glass pipe is rotated and the part of the coating film where the coating material is separated from the glass pipe at the time of the lifting step become the same, and the antireflection film is formed at only one circumferential position with the part having a thickness different from the other part. Accordingly, the antireflection function can be prevented from being deteriorated as compared with the case where the antireflection film is formed at two circumferential positions with the parts having different thicknesses, for example.

Advantageous Effects of Invention

According to the present invention, the time required for forming the antireflection films can be shortened.

BRIEF DESCRIPTION OF DRAWINGS

FIG. 50 is a longitudinal sectional view showing a state where the glass pipe is rotated by 360 degrees.

DESCRIPTION OF EMBODIMENTS

The following will describe an embodiment of a method of manufacturing a solar heat collection pipe with reference to FIGS. 1 to 9C.

Figure 1:
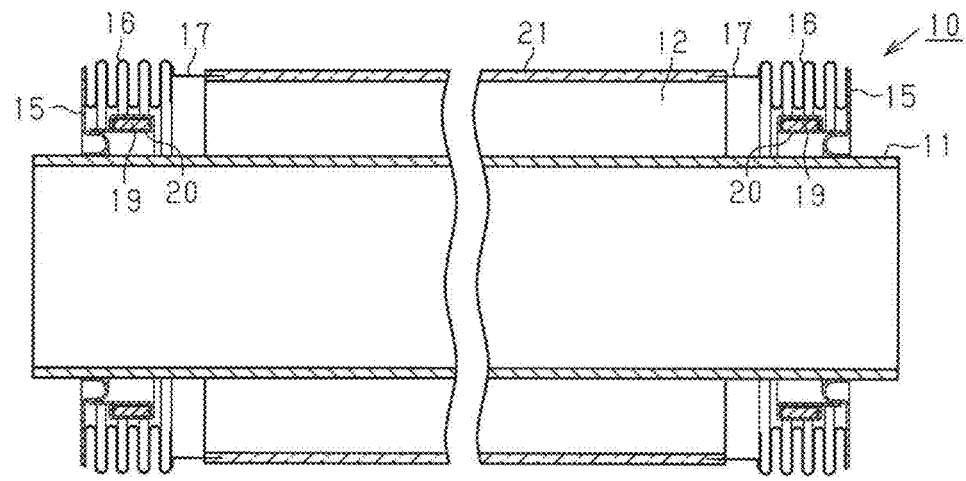
FIG. 1 is a side sectional view of an axial cross section of a solar heat collection pipe of an embodiment.

As shown in FIG. 1, a solar heat collection pipe 10 has a stainless pipe 11 as a metal pipe through which a heat medium is circulatable, and a glass pipe 21 that covers the outer circumference of the stainless pipe 11 with an annular vacuum space 12 formed between the stainless pipe 11 and the glass pipe 21. The solar heat collection pipe 10 includes a bellows 16 made of metal (stainless steel (SUS) in the present embodiment) that absorbs a thermal expansion difference between the stainless pipe 11 and the glass pipe 21.

The glass pipe 21 is formed to be shorter than the stainless pipe 11. The stainless pipe 11 is provided with a flange 15 at a position separated from the end portion of the glass pipe 21 by a predetermined amount. The stainless pipe 11, the flange 15, and the bellows 16 are made of stainless steel (SUS). The bellows 16 is connected by welding to the outer circumference portion of the flange 15 at one end, and is connected to the glass pipe 21 via a Kovar ring 17 at the other end.

The solar heat collection pipe 10 includes a getter 19 that adsorbs free hydrogen existing in the annular vacuum space 12. A getter holder 20 that accommodates and holds the getter 19 is provided in a state of being positioned inside the bellows 16.

Figure 2:
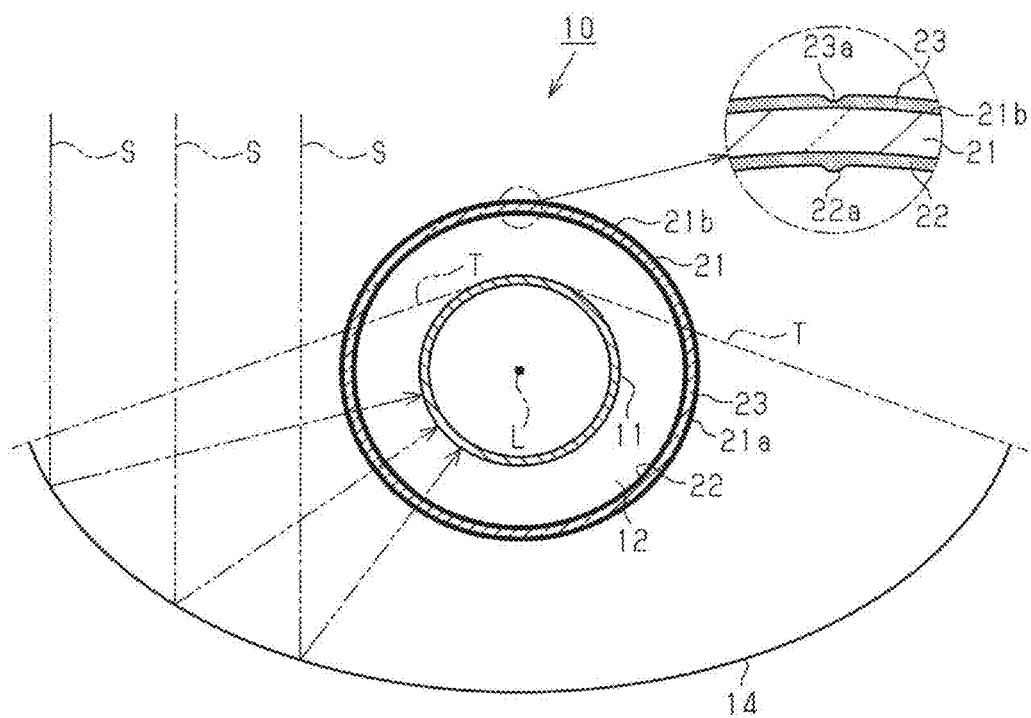
FIG. 2 is a longitudinal sectional view of a radial cross section of the solar heat collection pipe of the embodiment.

As shown in FIG. 2, the solar heat collection pipe 10 includes a curved mirror 14 as a light-condensing means. The curved mirror 14 condenses sunlight S onto the solar heat collection pipe 10. The curved mirror 14 is parabolic in a cross-sectional view along a radial direction of the glass pipe 21. The inner surface (surface on the solar heat collection pipe 10 side) of the curved mirror 14 is a mirror surface, and the stainless pipe 11 is supported at a focal position thereof. Of the surface of the glass pipe 21, a part through which the sunlight S condensed by the curved mirror 14 passes is a light-condensing surface 21a, and a part through which the sunlight S condensed by the curved mirror 14 hardly passes is an anti-light-condensing surface 21b.

The sunlight S condensed by the curved mirror 14 passes through the lower half of the surface of the glass pipe 21. Therefore, the light-condensing surface 21a may be provided at least within a half circumference of the glass pipe 21 (a lower half circumference in the present embodiment). In the present embodiment, the lower side of a tangent line T of the stainless pipe 11 passing through the vicinity of the upper end of the stainless pipe 11 and passing through each end portion of the curved mirror 14 is the light-condensing surface 21a, and the upper side of the tangent line T is the anti-light-condensing surface 21b. The sunlight S passes directly through the anti-light-condensing surface 21b, but the sunlight S passing through the anti-light-condensing surface 21b has little effect on the heat collecting function.

As shown in the enlarged view of FIG. 2, the glass pipe 21 includes a first antireflection film 22 on the inner surface and a second antireflection film 23 on the outer surface. The first antireflection film 22 may cover the light-condensing surface 21a of the glass pipe 21. Since the light-condensing surface 21a may be provided at least within a lower half circumference of the glass pipe 21, the first antireflection film 22 may cover at least the lower half circumference of the glass pipe 21. In the present embodiment, the first antireflection film 22 is provided not only on the lower half circumference but also on the entire inner surface of the glass pipe 21.

The first antireflection film 22 is a silica film having mesopores. Here, the mesopore means a pore having a diameter of 2 nm to 50 nm. While the first antireflection film 22 is excellent in light transmission properties, the mechanical strength is low because the pore wall is amorphous, and the durability against the external environment is lower than that of the hollow silica film.

The first antireflection film 22 preferably has a porosity of 30% to 50%. By controlling to provide such porosity, the light-transmittance of the first antireflection film 22 can be improved. The thickness of the first antireflection film 22 is not particularly limited, but is preferably 80 nm to 200 nm. By controlling to provide such thickness, the light-transmittance of the first antireflection film 22 can be improved. The thickness of the first antireflection film 22 is preferably uniform, with variations in thickness suppressed.

The first antireflection film 22 can be formed by a sol-gel reaction. In the sol-gel reaction, the first antireflection film 22 is formed by applying the coating material that is a sol reaction liquid to the inner surface of the glass pipe 21 and drying it. The coating material generally includes a silica precursor material, an organic solvent, a catalyst, and water. The silica precursor material is not particularly limited but includes alkoxysilanes such as tetramethoxysilane, tetraethoxysilane, and tetrapropoxysilane. These may be used alone or in combination of two or more types.

The solvent is not particularly limited, but includes alcohols such as methanol, ethanol, 2-propanol, and 1-propanol. These may be used alone or in combination of two or more types. The catalyst is not particularly limited, but includes acids such as hydrochloric acid, acetic acid, and nitric acid, and bases such as sodium hydroxide and ammonia. These may be used alone or in combination of two or more types.

Next, the second antireflection film 23 will be described. The second antireflection film 23 may cover the light-condensing surface 21a of the glass pipe 21. Since the light-condensing surface 21a may be provided at least within a half circumference (a lower half circumference in the present embodiment) of the glass pipe 21, the second antireflection film 23 may cover at least the lower half circumference of the glass pipe 21. In the present embodiment, the second antireflection film 23 is provided not only on the lower half circumference but also on the entire outer surface of the glass pipe 21.

The second antireflection film 23 is a film mainly composed of hollow silica particles. Here, the hollow silica particle is a silica particle having a space inside thereof. The hollow silica film is slightly inferior in light transmission properties to the mesoporous silica film that is the first antireflection film 22, but is high in mechanical strength because the hollow silica particles are regularly bonded, and thus the hollow silica film is higher in durability against the external environment than the mesoporous silica film.

The second antireflection film 23 can be formed by a sol-gel reaction. In the sol-gel reaction, the second antireflection film 23 can be formed by applying a coating material that is a sol reaction liquid including a hollow silica soil, a silicon compound, and a metal chelate compound to the outer surface of the glass pipe 21 and drying it. The silicon compound used for the coating material includes silane coupling agents such as tetramethoxysilane, tetraethoxysilane, and tetrapropoxysilane. These may be used alone or in combination of two or more types.

The metal chelate compound used for the coating material includes compounds of titanium, zirconium, aluminum, tin, niobium, tantalum, or lead that have bidentate ligand such as acetylacetonato. These may be used alone or in combination of two or more types. The organic solvent used for dispersion solution includes alcohols such as methanol, ethanol, 2-propanol, and 1-propanol. These may be used alone or in combination of two or more types.

The average particle diameter of the hollow silica particles constituting the second antireflection film 23 is not particularly limited, but is preferably 10 nm to 100 nm. By controlling to provide such average particle diameter, the light-transmittance of the second antireflection film 23 can be improved.

The porosity of the second antireflection film 23 is not particularly limited, but is preferably 20% to 40%. By controlling to provide such porosity, the light-transmittance of the glass pipe 21 can be improved. The thickness of the second antireflection film 23 is not particularly limited, but is preferably 80 nm to 200 nm. By controlling to provide such thickness, the light-transmittance of the glass pipe 21 can be improved. The thickness of the second antireflection film 23 is preferably uniform, with variations in thickness suppressed.

Next, the inner circumferential film forming step of forming the first antireflection film 22 on the inner surface of the glass pipe 21 and the outer circumferential film forming step of forming the second antireflection film 23 on the outer surface of the glass pipe 21 will be described.

First, the inner circumferential film forming step will be described.

The inner circumferential film forming step has the injection step of injecting the coating material into the glass pipe 21, the inner circumference coating step of applying the coating material to the inner surface of the glass pipe 21 to form a coating film, the coating material discharging step of discharging the coating material remaining in the glass pipe 21 to the outside of the glass pipe 21, and the drying step of drying the coating film formed in the inner circumference coating step.

Figure 3:
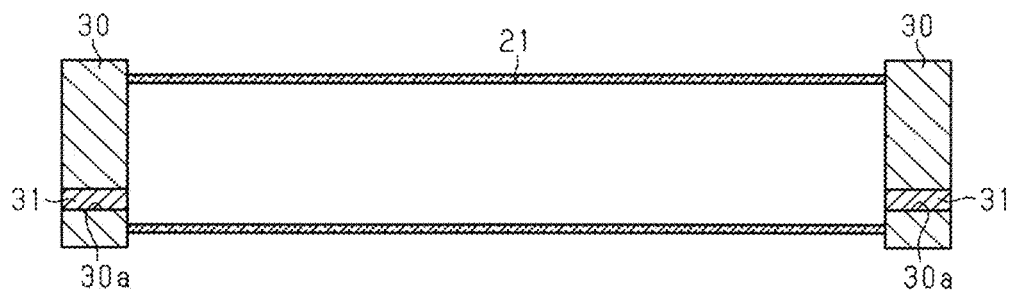
FIG. 3 is a side sectional view showing a state where a sealing member is attached to a glass pipe.

As shown in FIG. 3, in the inner circumferential film forming step, sealing members 30 that seal both axial end openings of the glass pipe 21 are used. Each sealing member 30 includes an opening portion 30a penetrating in the thickness direction. The opening portion 30a can be closed by a sealing plug 31 and can be opened by removing the sealing plug 31.

Figure 4A:
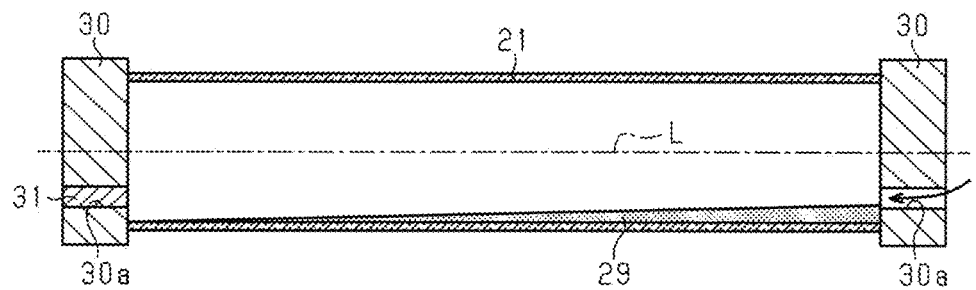
FIG. 4A is a side sectional view showing a coating material injection process.

As shown in FIG. 4A, in the injection step, the glass pipe 21 is held while maintaining a center axis L of the glass pipe 21 in a horizontal position. Then, the opening portion 30a of one sealing member 30 is opened. At this time, the glass pipe 21 and the sealing member 30 are arranged so that the opening portion 30a is positioned directly below. Then, a coating material 29 for forming the first antireflection film 22 is gently injected into the glass pipe 21 from the opening portion 30a that is opened. At this time, the coating material 29 to be injected is prevented from spreading in the circumferential direction of the glass pipe 21, so that the coating material 29 flows in a line.

Figure 4B:
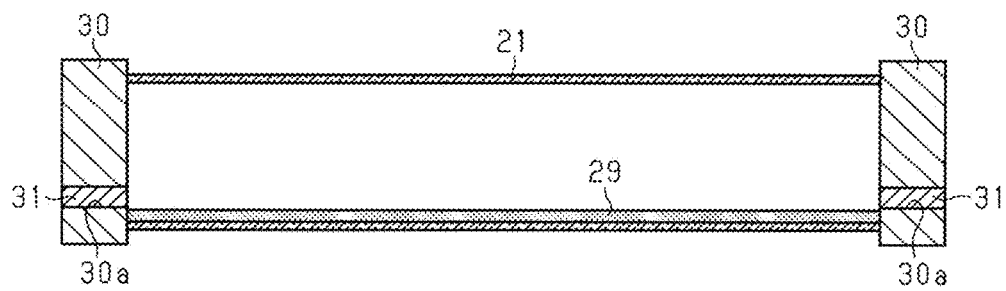
FIG. 4B is a side sectional view showing a state where an opening portion is sealed.

Then, as shown in FIG. 4B, the coating material 29 is stored in the lowermost portion of the glass pipe 21 over the entire axial direction of the glass pipe 21. After that, the opening portion 30a opened for injecting the coating material 29 is sealed with the sealing plug 31.

Next, the inner circumference coating step is performed.

Figure 5A:
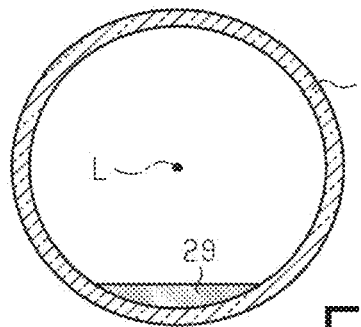
FIG. 5A is a longitudinal sectional view showing a state where a coating material is injected.
Figure 5B:
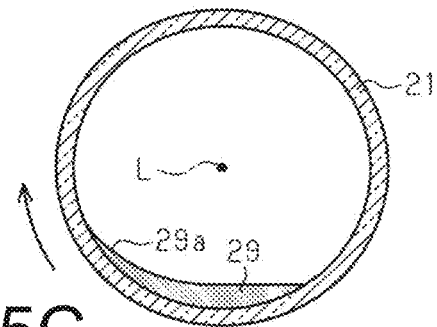
FIG. 5B is a longitudinal sectional view showing a state where the glass pipe is rotated about its center axis.
Figure 5C:
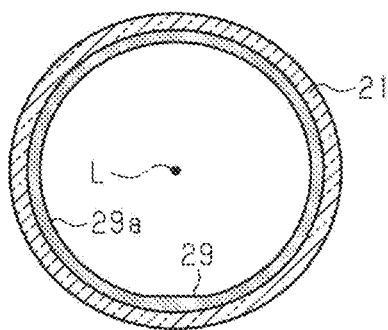

As shown in FIGS. 5A to 5C, in the inner circumference coating step, the glass pipe 21 is rotated by 360 degrees about the center axis L of the glass pipe 21 as a rotation axis while maintaining the center axis L in a horizontal position. At this time, the glass pipe 21 is gently rotated so that the liquid surface of the stored coating material 29 does not wave. Then, the inner surface of the glass pipe 21 passes through the part where the coating material 29 is stored, the coating material 29 is applied to the entire inner surface of the glass pipe 21, and a coating film 29a is formed over the entire circumferential direction of the glass pipe 21. When the glass pipe 21 is rotated by 360 degrees, the place where the coating material 29 is stored before the rotation is positioned directly below again, and the remaining coating material 29 is stored in the lowermost portion of the glass pipe 21.

Next, the coating material discharging step is performed.

Figure 6:
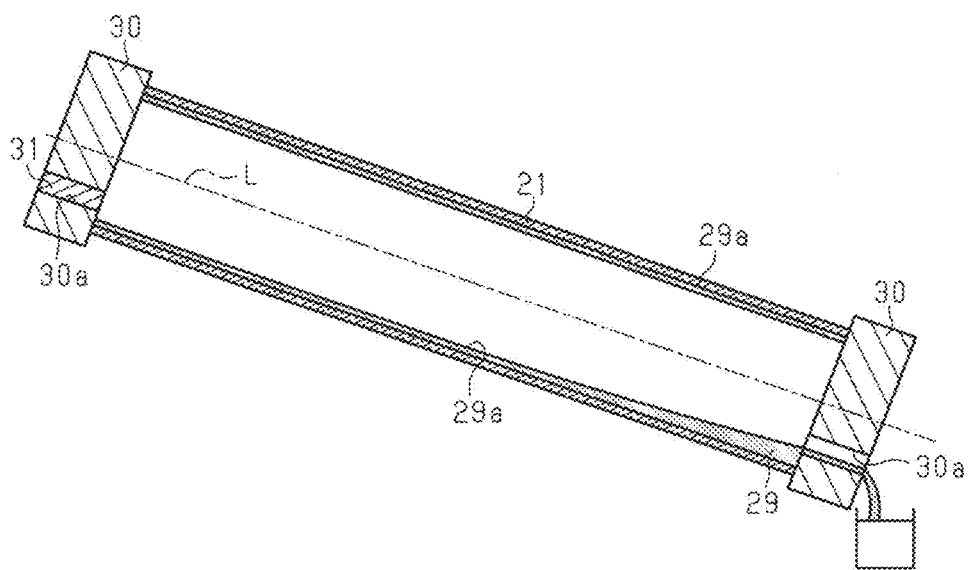
FIG. 6 is a side sectional view showing a coating material discharging step.

As shown in FIG. 6, in the coating material discharging step, first, the sealing plug 31 is removed from one sealing member 30 to open the opening portion 30a. Next, the glass pipe 21 is inclined so that the opened opening portion 30a, i.e., one axial end of the glass pipe 21 becomes the lower end, and the center axis L of the glass pipe 21 is inclined with respect to the horizontal position. At this time, the circumferential position of the glass pipe 21 is fixed, and the glass pipe 21 is inclined without being rotated. Then, the coating material 29 remaining in the glass pipe 21 flows in a line on the coating film 29a from the upper end side towards the lower end of the glass pipe 21, and is discharged from the opening portion 30a to the outside of the glass pipe 21.

In the glass pipe 21 after the coating material 29 has been discharged, the coating material 29 remains on the coating film 29a until the coating material 29 is discharged, and hence the part of the coating film 29a where the coating material 29 is flowed is thicker than the other part.

Next, the drying step is performed.

Figure 7:
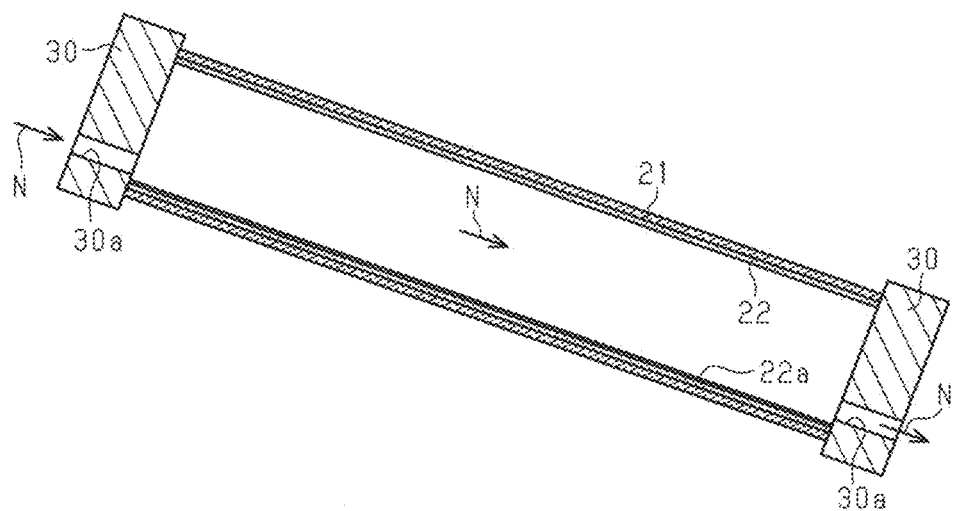
FIG. 7 is a side sectional view showing a drying step.

As shown in FIG. 7, in the coating material discharging step, with the glass pipe 21 being kept inclined and the circumferential position of the glass pipe 21 being fixed, the sealing plug 31 is removed also from the other sealing member 30 to open both axial ends of the glass pipe 21. Then, hot air N is sent into the glass pipe 21 from the opening portion 30a on the upper end side, so that the coating film 29a formed on the inner surface of the glass pipe 21 is dried. When the coating film 29a is dried, the first antireflection film 22 is formed.

As shown in the enlarged view of FIG. 2 or in FIG. 7, the first antireflection film 22 having been formed is formed at a part of the coating film 29a where the coating material 29 is flowed in the coating material discharging step with a thick film portion 22a that is thicker than the other part. The thick film portion 22a extends linearly over the entire axial direction of the glass pipe 21.

Next, the outer circumferential film forming step will be described.

The outer circumferential film forming step has the outer circumference coating step of applying the coating material onto the outer surface of the glass pipe 21 by bringing the glass pipe 21 into contact with the coating material stored in the storage portion, the lifting step of lifting the glass pipe 21 from the coating material stored in the storage portion, and the drying step of drying the coating film formed in the outer circumference coating step.

Figure 8A:
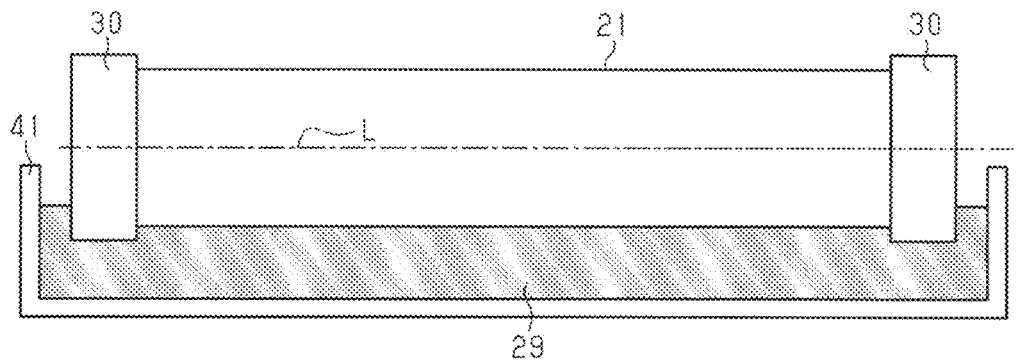
FIG. 8A is a side sectional view showing an outer circumference coating step.

As shown in FIG. 8A, in the outer circumferential film forming step, first, both axial end openings of the glass pipe 21 are sealed with the sealing members 30. The sealing members 30 are the same as those used in the inner circumferential film forming step, but the opening portions 30a are sealed with the sealing plugs 31. Instead of the sealing members 30s that include the opening portions 30a, the sealing members 30 that do not include the opening portions 30a may be used.

Figure 8B:
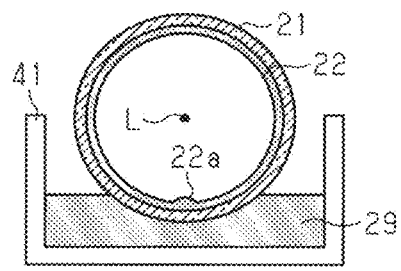
FIG. 8B is a longitudinal sectional view showing the outer circumference coating step.

Next, the center axis L of the glass pipe 21 is maintained in a horizontal position. Then, the glass pipe 21 is moved towards a storage portion 41 in which the coating material 29 is stored, and a part of the outer surface of the glass pipe 21 is brought into contact with the coating material 29 over the entire axial direction of the glass pipe 21. Here, as shown in FIG. 8B, when the coating material 29 is brought into contact with the outer surface of the glass pipe 21, the thick film portion 22a of the first antireflection film 22 formed in the inner circumferential film forming step is positioned directly below.

Figure 9A:
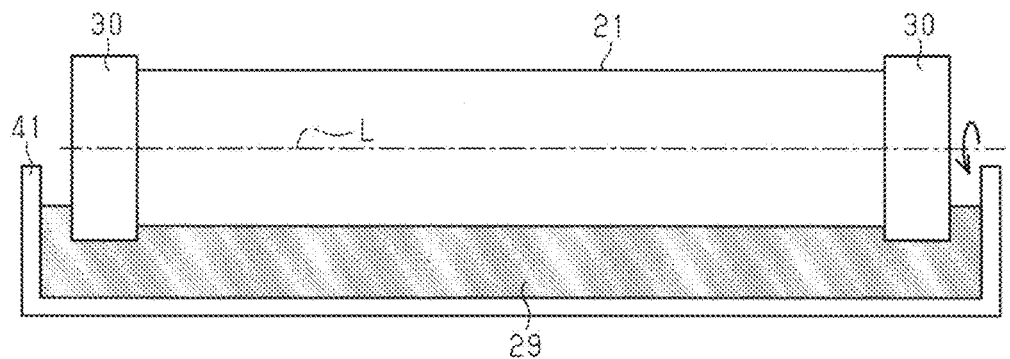
FIG. 9A is a side view showing the outer circumference coating step.
Figure 9B:
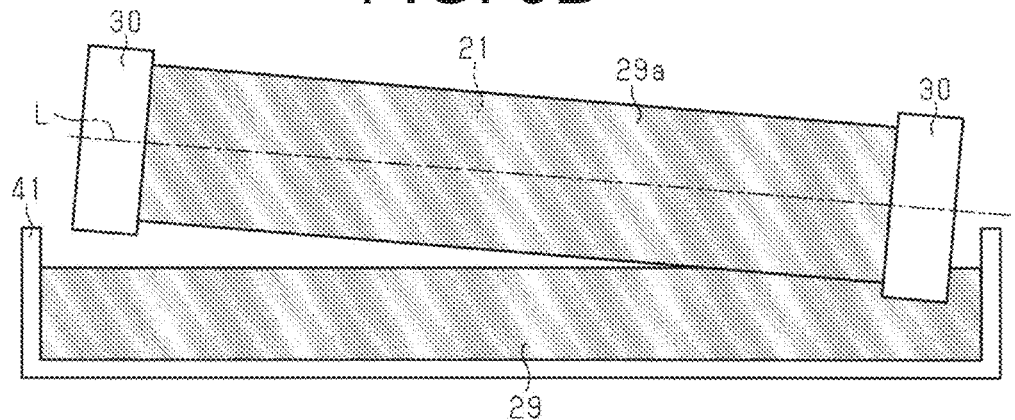
FIG. 9B is a side view showing a lifting step.

As shown in FIG. 9A, in the outer circumference coating step, the glass pipe 21 is rotated by 360 degrees about the center axis L of the glass pipe 21 as a rotation axis. At this time, the glass pipe 21 is gently rotated so that the liquid surface of the coating material 29 stored in the storage portion 41 does not wave. Then, as shown in FIG. 9b, the coating material 29 is applied to the entire outer surface of the glass pipe 21 to form the coating film 29a. When the glass pipe 21 is rotated by 360 degrees, the place in contact with the coating material 29 before the rotation is positioned directly below and is again brought into contact with the coating material 29.

Next, the lifting step is performed.

In the lifting step, first, one axial end portion of the glass pipe 21 becomes the lower end, and the glass pipe 21 is lifted from the other axial end in a state where the circumferential position of the glass pipe 21 is fixed and not rotated, and the center axis L of the glass pipe 21 is inclined with respect to the horizontal position. Since the glass pipe 21 is not rotated, the thick film portion 22a formed on the inner surface of the glass pipe 21 and the part of the coating film 29a with which the coating material 29 is in contact when the glass pipe 21 is lifted are positioned within a half circumference of the glass pipe 21. As the glass pipe 21 is lifted, the coating material 29 is separated from the outer surface of the glass pipe 21 along the axial direction.

At this time, the coating material 29 is sequentially separated from the outer surface of the glass pipe 21 as the glass pipe 21 is lifted. Due to this, the coating material 29 is suppressed from dropping as droplets from the outer surface of the glass pipe 21. When one axial end of the glass pipe 21 is lifted from the coating material 29, the glass pipe 21 is lifted from the coating material 29 throughout the entire axial direction of the glass pipe 21.

Here, on the outer surface of the glass pipe 21 after being lifted from the coating material 29, the part of the coating film 29a with which the coating material 29 is in contact when being lifted from the coating material 29 is reduced in the coating material 29 as compared with the other part, and the thickness of the coating film 29a is reduced.

Next, the drying step is performed.

Figure 9C:
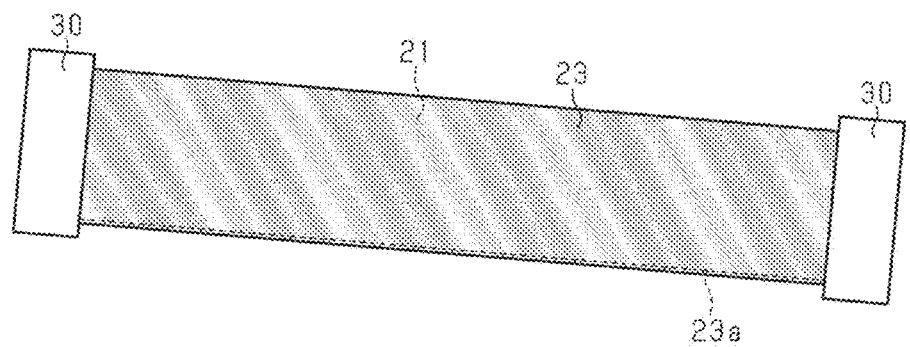
FIG. 9C is a side view showing a drying step.

As shown in FIG. 9C, the glass pipe 21 is arranged with the glass pipe 21 remaining inclined in the lifting step and with the circumferential position of the glass pipe 21 being fixed, and the coating film 29a on the outside of the glass pipe 21 is naturally dried. When the coating film 29a is dried, the second antireflection film 23 is formed.

After drying the first antireflection film 22 and the second antireflection film 23, the glass pipe 21 is placed under a high-temperature atmosphere for a predetermined length of time, thereby baking the first antireflection film 22 and the second antireflection film 23 onto the glass pipe 21.

As shown in the enlarged view of FIG. 2 or in FIG. 9D, the second antireflection film 23 is formed at a part of the coating film 29a where the coating material 29 is separated from the glass pipe 21 in the lifting step with a thin film portion 23a having a thickness smaller than that of the other part. The thin film portion 23a extends linearly in the entire axial direction of the glass pipe 21.

The thick film portion 22a of the first antireflection film 22 and the thin film portion 23a of the second antireflection film 23 are each formed in a shape extending linearly at only one circumferential position of the glass pipe 21. The thick film portion 22a and the thin film portion 23a are formed at positions facing each other across the glass pipe 21 in the radial direction of the glass pipe 21.

The glass pipe 21 in which the first antireflection film 22 is formed in the inner circumferential film forming step and the second antireflection film 23 is formed in the outer circumferential film forming step is incorporated into the solar heat collection pipe 10 so that the thick film portion 22a and the thin film portion 23a are positioned on the anti-light-condensing surface 21b, Specifically, the glass pipe 21 is incorporated so that the thick film portion 22a and the thin film portion 23a are positioned at the upper end of the glass pipe 21.

According to the above embodiment, the following operations and effects can be obtained.

(1) In the inner circumferential film forming step, the glass pipe 21 in which the coating material 29 is sealed is rotated to form the coating film 29a on the inner surface of the glass pipe 21, and in the outer circumferential film forming step, the glass pipe 21 is rotated with the glass pipe 21 brought into contact with the coating material 29 to form the coating film 29a on the outer surface. Accordingly, as compared with the case where the coating material 29 is applied to the glass pipe 21 that is vertically arranged, the circumferential length is shorter than the axial length of the glass pipe 21, and hence the time required for forming the film can be shortened.

(2) When the coating material 29 is discharged from the inside of the glass pipe 21 in the coating material discharging step and when the glass pipe 21 is lifted from the coating material 29 in the lifting step, the thick film portion 22a and the thin film portion 23a are formed, and the thick film portion 22a and the thin film portion 23a are positioned on the anti-light-condensing surface 21b of the glass pipe 21. Accordingly, even if the thick film portion 22a and the thin film portion 23a are formed, the light-condensing function is hardly affected. Accordingly, even in the manufacturing method by which the thick film portion 22a and the thin film portion 23a are formed, the function of the solar heat collection pipe 10 is not deteriorated, and the time required for forming the film of the solar heat collection pipe 10 can be shortened.

(3) In the inner circumference coating step, the glass pipe 21 is rotated by 360 degrees. Due to this, the part of the coating film 29a where the coating material 29 is stored before the glass pipe 21 is rotated and the part of the coating film 29a where the coating material 29 flows in the coating material discharging step become the same, and the thick film portion 22a is formed at only one circumferential position of the first antireflection film 22. Accordingly, for example, as compared with the case where the thick film portion 22a is formed in two circumferential positions, it is possible to reduce the number of positions where the antireflection function is deteriorated.

(4) In the outer circumference coating step, the glass pipe 21 is rotated by 360 degrees. Due to this, the part of the coating film 29a brought into contact with the coating material 29 before the glass pipe 21 is rotated and the part of the coating film 29a in which the coating material 29 is separated from the glass pipe 21 in the lifting step become the same, and the thin film portion 23a is formed at only one circumferential position of the second antireflection film 23. Accordingly, for example, as compared with the case where the thin film portion 23a is formed in two circumferential positions, it is possible to reduce the number of positions where the antireflection function is deteriorated.

(5) In the outer circumferential film forming step, the thin film portion 23a is formed corresponding to the thick film portion 22a formed in the inner circumferential film forming step. Accordingly, the thick film portion 22a and the thin film portion 23a are formed at positions where they face each other, sandwiching the glass pipe 21 in the radial direction. Accordingly, the thick film portion 22a and the thin film portion 23a can be formed at one circumferential position of the glass pipe 21. For example, as compared with the case where the thick film portion 22a and the thin film portion 23a are formed at different circumferential positions, it is possible to reduce the number of positions where the antireflection function is deteriorated.

(6) In the inner circumference coating step and the outer circumference coating step, the glass pipe 21 is rotated to apply the coating material 29 to the glass pipe 21. Due to this, the liquid surface of the coating material 29 is less likely to shake, and the thickness of the coating film 29a can be suppressed from varying.

The above embodiment may be modified as follows.

In the inner circumference coating step, the glass pipe 21 may be rotated in a range from 180 degrees to than 359 degrees inclusive. In this case, as the angle of rotation of the glass pipe 21 becomes smaller than 359 degrees, the part of the coating film 29a where the coating material 29 flows at the time of the coating material discharging step is formed at a position distant from the part of the coating film 29a where the coating material 29 is stored before the glass pipe 21 is rotated. However, since the thick film portion 22a is positioned on the anti-light-condensing surface 21b of the glass pipe 21, the antireflection function is hardly affected.

In the outer circumference coating step, the glass pipe 21 may be rotated in a range from 180 degrees to 359 degrees inclusive. In this case, as the angle of rotation of the glass pipe 21 becomes smaller than 359 degrees, the part of the coating film 29a where the coating material 29 flows down at the time of the lifting step is formed at a position distant from the part of the coating film 29a that is in contact with the coating material 29 before the glass pipe 21 is rotated. However, since the thin film portion 23a is positioned on the anti-light-condensing surface 21b of the glass pipe 21, the antireflection function is hardly affected.

In any one of the inner circumference coating step and the outer circumference coating step, the glass pipe 21 may be rotated by 360 degrees, and in the other one of them, the glass pipe 21 may be rotated in a range from 180 degrees to 359 degrees inclusive.

In the embodiment, the first antireflection film 22 is formed before the second antireflection film 23 is formed, but the present invention is not limited thereto. The inner circumferential film forming step may be performed while the outside of the glass pipe 21 is dried in the outer circumferential film forming step.

In this case, the drying step in the outer circumferential film forming step is performed by natural drying. Due to this, when the first antireflection film 22 is formed in the inner circumferential film forming step, the glass pipe 21 does not vibrate due to the drying step, and the formation of the first antireflection film 22 is not affected. Accordingly, a part of the outer circumferential film forming step and the inner circumferential film forming step can be performed simultaneously, and the time required for the film forming step of the antireflection films can be shortened.

The thick film portion 22a of the first antireflection film 22 and the thin film portion 23a of the second antireflection film 23 may be formed at positions shifted in the circumferential direction of the glass pipe 21 as long as within a half circumference of the glass pipe 21.

The drying step in the inner circumferential film forming step may be performed by a method other than the method of sending hot air, and for example, may be performed by drying under reduced pressure in which pressure in the glass pipe 21 is reduced and an inside of the glass pipe 21 is dried. The drying step in the outer circumferential film forming step may be performed by a method other than the method of natural drying, and for example, may be performed by a method of drying by sending hot air towards the glass pipe 21.

The stainless pipe 11 and the bellows 16 may be formed of a metal other than stainless steel.

Next, the technical idea that can be grasped from the above embodiment and other examples will be described below.

(1) The method of manufacturing the solar heat collection pipe, in which the inner circumferential film forming step is performed while an outside of the glass pipe is dried in the outer circumferential film forming step.

REFERENCE SIGNS LIST

L center axis
10 solar heat collection pipe
11 stainless pipe as metal pipe
21 glass pipe
22 first antireflection film
23 second antireflection film
29 coating material
29a coating film
41 storage portion

The invention claimed is:

1. A method of manufacturing a solar heat collection pipe, the solar heat collection pipe including:
   a cylindrical metal pipe through which a heat medium is circulatable;
   a cylindrical glass pipe arranged outside an outer circumference of the metal pipe;
   an antireflection film provided on an inner surface of the glass pipe; and
   an antireflection film provided on an outer surface of the glass pipe,
   the method comprising:
   an inner circumferential film forming step of forming the antireflection film on the inner surface of the glass pipe; and
   an outer circumferential film forming step of forming the antireflection film on the outer surface of the glass pipe,
   wherein
   the inner circumferential film forming step includes:
   an inner circumference coating step in which the glass pipe is rotated about a center axis of the glass pipe as a rotation axis while maintaining the center axis in a horizontal position, to apply a coating material in the glass pipe on the inner surface of the glass pipe to thereby form a coating film;

a coating material discharging step in which, after the inner circumference coating step, in a state where a circumferential position of the glass pipe is fixed, the glass pipe is inclined so that one axial end of the glass pipe becomes a lower end, to discharge the coating material remaining in the glass pipe to an outside of the glass pipe; and a drying step of drying the coating film formed in the inner circumference coating step, the outer circumferential film forming step includes:

an outer circumference coating step in which, in a state where the center axis of the glass pipe is maintained in a horizontal position, the glass pipe is rotated about the center axis as the rotation axis while bringing a part of the outer surface of the glass pipe into contact with the coating material stored in a storage portion throughout an entire axial direction of the glass pipe, to apply the coating material on the outer surface to thereby form a coating film;

a lifting step in which, after the outer circumference coating step, in a state where a circumferential position of the glass pipe is fixed, the glass pipe is lifted from the coating material stored in the storage portion while inclining the glass pipe about one axial end of the glass pipe; and a drying step of drying the coating film formed in the outer circumference coating step, wherein the inner circumferential film forming step and the outer circumferential film forming step are performed so that a part of the coating film on the inner surface of the glass pipe through which the coating material remaining in the glass pipe is flowed when the coating material remaining in the glass pipe is discharged from the glass pipe in the coating material discharging step and a part of the coating film on the outer surface of the glass pipe with which the coating material stored in the storage portion is in contact when the glass pipe is lifted from the coating material stored in the storage portion in the lifting step are positioned within a half circumference of the glass pipe in a circumferential direction of the glass pipe.

2. The method of manufacturing the solar heat collection pipe according to claim 1, wherein the inner circumferential film forming step and the outer circumferential film forming step are performed so that the part of the coating film on the inner surface of the glass pipe through which the coating material remaining in the glass pipe is flowed when the coating material remaining in the glass pipe is discharged from the glass pipe in the coating material discharging step and the part of the coating film on the outer surface of the glass pipe with which the coating material stored in the storage portion is in contact when the glass pipe is lifted from the coating material stored in the storage portion in the lifting step radially face each other across the glass pipe.

3. The method of manufacturing the solar heat collection pipe according to claim 1, wherein, in the inner circumference coating step, the glass pipe is rotated by 360 degrees.

4. The method of manufacturing the solar heat collection pipe according to claim 1, wherein, in the outer circumference coating step, the glass pipe is rotated by 360 degrees.

5. The method of manufacturing the solar heat collection pipe according to claim 1, wherein the inner circumferential film forming step is performed while the outside of the glass pipe is dried in the outer circumferential film forming step.

* * * * *